L. V. REDMAN, A. J. WEITH, AND F. P. BROCK.
PHENOLIC CONDENSATION PRODUCT ARTICLE AND METHOD OF MANUFACTURE.
APPLICATION FILED SEPT. 8, 1921.
1,424,738. Patented Aug. 1, 1922.
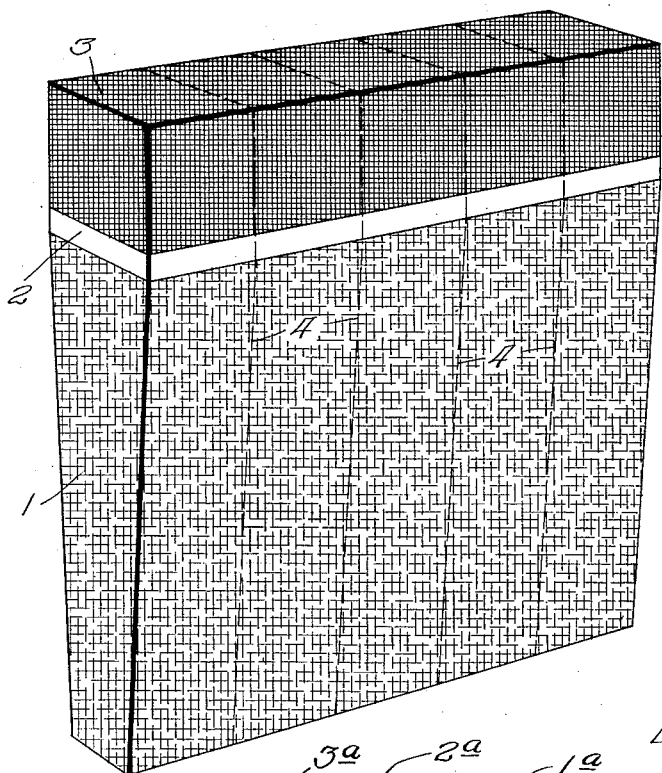
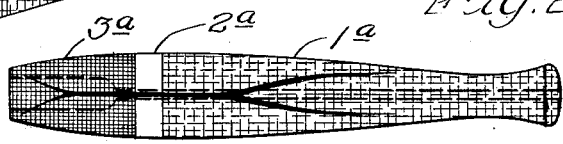
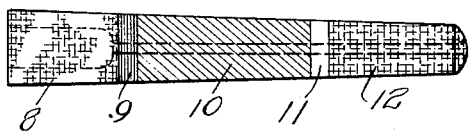
Inventors,
Lawrence V. Redman,
Archie J. Weith,
Frank P. Brock.

UNITED STATES PATENT OFFICE.

LAWRENCE V. REDMAN, ARCHIE J. WEITH, AND FRANK P. BROCK, OF EVANSTON, ILLINOIS, ASSIGNORS TO REDMANOL CHEMICAL PRODUCTS COMPANY, OF CHICAGO, ILLINOIS, A CORPORATION OF WEST VIRGINIA.

PHENOLIC CONDENSATION PRODUCT ARTICLE AND METHOD OF MANUFACTURE.

1,424,738.          Specification of Letters Patent.      Patented Aug. 1, 1922.

Application filed September 8, 1921. Serial No. 499,213.

*To all whom it may concern:*

Be it known that we, LAWRENCE V. REDMAN, a citizen of Canada, residing at Evanston, in the county of Cook and State of Illinois, ARCHIE J. WEITH and FRANK P. BROCK, citizens of the United States, residing, respectively, at Evanston, in the county of Cook and State of Illinois, have invented a new and useful Improvement in Phenolic Condensation Product Articles and Methods of Manufacture, of which the following is a specification.

This invention relates particularly to the manufacture of phenolic condensation product articles, such as cigar-holders, cigarette-holders, pipe and pipe parts, or other articles which are manufactured from an infusible, and for practical purposes made substantially insoluble, phenolic condensation product.

The primary object is to provide an easily practiced and cheap method of manufacturing phenolic condensation product articles, employing in such manufacture infusible phenolic condensation products of different colors.

A further object is to provide articles of this character which are of improved appearance and which can be manufactured at moderate cost.

The invention is illustrated in the accompanying drawing and will be described with reference thereto. The drawing illustrates a slab or plate of material made by uniting plates of infusible phenolic condensation product of different colors, and illustrates articles formed therefrom. In the drawing—

Fig. 1 represents a perspective view of a slab of material comprising a plurality of plates each consisting of infusible phenolic condensation product, the plates being of different color and united together; Fig. 2, a view of a cigarette-holder formed from a section cut from the slab shown in Fig. 1; Fig. 3, a view of a pipe made in accordance with the invention; and, Fig. 4, a view of a cigarette-holder made in accordance with the invention.

Fig. 1 shows a slab of material comprising a plate 1 of infusible phenolic condensation product, which is now known on the market as substantially insoluble, this plate being of a given color, such as amber, or pale lemon color; a plate 2 united to the end of the plate 1, the plate 2 being a relatively thin plate and of a different color from the plate 1, such as opaque white; and a plate 3, united to the plate 2, the plate 3 being of a still different color, such as black. In the illustration given, the slab shown in Fig. 1 is so designed that the portion 1 is adapted to form the stem portion of a cigarette-holder, the plate 3 is adapted to form the portion which provides the socket for the cigarette, and the plate 2 is in the nature of an insert plate. The sides of the plate 1 are preferably made convergent or tapering to conserve material. The slab may be cut or sawed into sections along the planes of the dotted lines, as indicated at 4, the sections thus obtained being adapted to be turned, drilled or bored to fasten them into cigarette-holders, for example.

The method of uniting the plates, strips or blocks of different colored phenolic condensation product is preferably as follows:

The plates are provided with flat surfaces which are adapted to abut against each other. For example, the plate 1 has a flat and substantially smooth end surface, and the plate 2 has a corresponding side surface which rests thereon. Similarly, the plates 2 and 3 have flat surfaces which abut against each other. The preferred method of uniting the surfaces is to coat such surfaces with a solution of fusible phenolic condensation product made from phenol and a methylene body, such as hexamethylenetetramine or formaldehyde, the proportions being such that the fusible phenolic condensation product will, under the influence of heat, be converted to an infusible and substantially insoluble product. It is preferred to employ a solution which contains about 40 per cent of the phenolic resin and about 60 per cent of a suitable solvent, such as alcohol, acetone or a mixture thereof.

Phenolic condensation products now in use for making cigarette-holders, cigar-holders, pipe-stems and the like are infusible and are known as substantially insoluble. They are the final condensation products but not of the hardest and most resistant character. One mol. of hexamethylenetetramine compounded with about 6 mols. of phenol will yield a very hard and resistant phenolic condensation product. Also, equal volumes of phenol and a 40 per cent solution of formaldehyde will yield under proper process of manufacture, a hard and resistant product. In other words, one phenol and an active methylene body are condensed in the proportions of one methylene group to one phenol group, or, if there be a slight excess of methylene, a very hard, inert and chemically resistant product results. To facilitate the manufacture of cigarette-holders and the like, or to enable the phenolic condensation product to be properly worked, it is desirable to employ a slight excess of phenol. For example, where the methylene body employed is hexamethylenetetramine, it is desirable to employ 6.2 mols. of phenol to 1 mol. of hexamethylenetetramine. Such a product is preferably employed in the present process; and it is desirable to employ in the varnish used for uniting the plates of phenolic condensation product a fusible resin produced by compounding phenol and an active methylene body in such proportions as to furnish a larger percentage of methylene than is present in the plates of the phenolic condensation product employed. For example, where the plates are made from phenol and hexamethylenetetramine in the proportions of one mol. of hexamethylenetetramine to 6.2 mols. of phenol, it is desirable that the varnish employed is made from the same materials and shall correspond with about one mol. of hexamethylenetetramine to 5.9 mols. of phenol. In other words, it is desirable that the percentage of methylenes shall be greater in the varnish and it is desirable that there shall be some excess of methylenes over the proportions theoretically called for in the uniting of phenol and the methylene body.

The precise method of uniting the plates, which is the preferred, is as follows:

Coat the surfaces which are to be united with a 40 per cent solution of phenolic condensation product resin; allow the surfaces to dry somewhat in the air until the solvent pretty largely disappears, and then clamp the plates together securely and subject them to a temperature of about 125° C. for a period of about 1½ hours. This results in uniting or bonding the plates securely together, the phenolic condensation product resin employed in the varnish being, in this operation, converted to the infusible and substantially insoluble state.

The solvent in the varnish acts to soften the surfaces of the plates, the resin of the varnish enters the interstices between the surface particles of the plates, and the baking operation hardens the materials at the joints into an infusible and substantially insoluble state. Indeed, the slight excess of methylenes insures the conversion of the resin of the varnish into the hardest and most inert condition, and also insures the conversion of any slight amount of free phenol which may be at the surfaces of the plates into a condensation product of very hard and inert character. The result is that the joints between the plates of the material become as strong and even stronger than the plates themselves. At the same time, the united surfaces provide such thin films of the very hard material as to not interfere with the working of the slab as a whole when it becomes necessary to saw the slab into sections and work the sections into finished articles.

Figure 2 illustrates a cigarette-holder made from a section cut from the slab shown in Fig. 1. 1ª represents the stem and bit of the holder; 2ª represents the insert portion; and 3ª represents the tip of the holder.

In Fig. 3 is illustrated a pipe made of sections 4, 5 and 6 of the phenolic condensation products of different colors, and a section 7 of wood. The section 4 furnishes the bit of the pipe-stem; the section 6 furnishes the other main section of the pipe-stem and the base for the bowl; and the section 5 furnishes an insert section between the sections 4 and 6. The section 5 is united or welded to the section 6 in the manner described above. The section 4 is illustrated as of amber color, the section 5 of black color; and the section 6 of cloudy amber color. The bowl section 7 is detachable from the base portion of the bowl, and the bit-section 4 is detachable from the section 5. Thus, the section 4 is shown provided with a threaded reduced extension 4ª which screws into a threaded socket in the section 5, the section 5 being of black color effectually as well as the threaded connection. Thus, the pipe may be separated for cleansing purposes, but presents a pleasing appearance.

In Fig. 4 is represented a cigarette-holder comprising a section 8 of cloudy amber color, a section 9 of ruby red color, a section 10 of emerald green color, a section 11 of opaque white color; and a bit-section 12 of light amber color. These sections are united in the manner described with reference to Fig. 1, and the slab, or a section thereof, is turned, drilled and bored to produce the cigarette-holder.

The improved method lends itself to a great variety of modifications in producing cigarette-holders, cigar-holders and pipes. Heretofore, the only known method to manufacturers of such articles for uniting phenolic condensation products of different colors is that which involves the tapping and threading of parts and screwing them together. This is objectionable, both because the method is expensive and because the threads are not hardened where the materials are transparent or semi-transparent.

The invention is a very desirable one for use in the manufacture of cigarette-holders, cigar-holders and pipes. It may be used advantageously in the manufacture of other articles, however, where phenolic condensation products are employed in such manufacture.

While it is preferred to employ, as a bonding agent, a varnish lacquer composed of about 40 per cent of a phenolic condensation product and about 60 per cent of a suitable solvent, the procedure may be varied. Using a 40 per cent solution, one application to each surface is sufficient for ordinary purposes. A solution employing a higher percentage of the resin may be employed, but it is not desirable to go above a 50 per cent solution, if the method set forth above be followed. It is desirable to employ a sufficient amount of the solvent to insure the softening of the surfaces of the plates which are to be united. If desired, a solution employing a considerably less percentage of resin may be employed. For example, a 25 per cent solution may be employed, in which case it will be desirable to make more than one application of the solution. If the surfaces which are to be united are preparatorily softened by means of a solvent, one may then employ a thicker varnish or lacquer; or one may then sift onto the softened surfaces a fusible phenolic condensation product which is in pulverulent form. In any case, the plates or parts which are to be united should then be clamped together under considerable pressure and subjected to heat treatment to convert the bonding agent to the infusible state. The heat treatment may vary greatly. For example, should the temperature employed be reduced below 100° C., it would be desirable to increase the baking period correspondingly.

Variegated effects may be produced by dovetailing the plates of different colors together. In any case, however, it is desirable that the surfaces which are to be united should conform to each other and be substantially smooth.

In accordance with the improved method, manufacturers of phenolic condensation products engaged in manufacturing plates or blocks of such condensation products for the manufacturing trade may supply composite slabs, blocks or strips comprising united sections of different colors, such as slabs, blocks, or the like, capable of being sawed, cut, turned, drilled, bored and polished in precisely the same manner as are slabs or blocks initially formed integrally. In other words, the composite slab or block may be treated in exactly the same manner as slabs or blocks composed of a single material. A condensation product of the character here referred to is usually prepared without the use of a filler, being either of a transparent, semi-transparent, semi-opaque or opaque character, practically a pure condensation product being employed, but a suitable coloring matter, or matter adapted to modify the color, being introduced during the course of the manufacture of the phenolic condensation product.

Various colors, dyes or pigments may be added to the fusible, soluble, potentially active phenol resin before the lacquer or varnish is applied as a glue or binding material to the surfaces of the infusible product. In this way rather curious effects can be produced. For example, if a green dye be added to the lacquer and two amber yellow transparent pieces be joined together, the resultant article will have the appearance of transparent yellow amber when the rays of light travel through it to the eye in a line parallel with the glued surface and the same article will have the appeaarnce of green amber when observed as the light travels through it in a line at right angles to the glued surface. In this way the transparent material can be given a two colored effect, or more, such as yellow and green, or red and purple, or transparent amber and opaque gold.

The foregoing detailed description has been given for clearness of understanding only, and no unnecessary limitations should be understood therefrom, but the appended claims should be construed as broadly as permissible in view of the prior art.

What we regard as new, and desire to secure by Letters Patent, is—

1. The method of uniting sections of infusible and substantially insoluble phenolic condensation products, which comprises subjecting the surfaces which are to be united to the action of a solvent and providing at said surfaces a fusible phenolic condensation product, and subjecting the plates to the action of heat while the surfaces to be united are in contact, and thus converting the fusible product to an infusible state.

2. The method of uniting sections of infusible and substantially insoluble phenolic condensation products, which comprises applying the solution of a fusible phenolic condensation product to the surfaces to be united, clamping the sections together, and subjecting the clamped sections to the action of heat.

3. The method of uniting sections of infusible and substantially insoluble phenolic condensation products, which comprises applying the solution of a fusible phenolic condensation product to the surfaces to be united, clamping the sections together and subjecting the clamped sections to the action of heat until the fusible phenolic condensation product is converted to the infusible state.

4. The method of uniting the sections of infusible and substantially insoluble phenolic condensation products, which comprises applying to the surfaces to be united a solution of a fusible phenolic condensation product which is capable of being converted to an infusible condition by the application of heat, causing the solvent of such solution to become dissipated, clamping the sections together, and subjecting the clamped sections to the action of heat.

5. The method of forming a slab comprising sections of infusible phenolic condensation products of different colors, which comprises preparing infusible and substantially insoluble phenolic condensation products of different colors by effecting condensation of phenols and an active methylene body and introducing the desired colors during the process of manufacture thereof, softening the surfaces of the sections of such phenolic condensation products by the application of a solvent and providing at the surfaces to be united a fusible phenolic condensation product capable of being converted to an infusible and substantially insoluble state, clamping the sections together, and subjecting the clamped sections to the action of heat.

6. The method of manufacturing a composite slab of infusible and substantially insoluble phenolic condensation products of different colors, which comprises effecting condensation of a phenolic body and a methylene body in the presence of a suitable coloring agent for each of the several sections, applying to the surfaces of the sections which are to be united a fusible phenolic condensation product and a solvent adapted to soften the surfaces of the sections, clamping the sections together and subjecting the clamped sections to the action of heat.

7. The method of manufacturing a composite slab of infusible and substantially insoluble phenolic condensation products of different colors, which comprises effecting condensation of a phenolic body and a methylene body in the presence of a suitable coloring agent, for each of the several sections, applying to the surfaces of the sections which are to be united a solution of a fusible phenolic condensation product, dissipating the solvent, and uniting the sections by the application of heat and pressure.

8. The method of forming a composite article composed of preparatorily manufactured sections of infusible and substantially insoluble phenolic condensation products, which comprises: introducing between said sections a fusible phenolic condensation product capable of being converted to an infusible and substantially insoluble state, clamping said sections together and subjecting them to the action of heat, and then tooling the composite body to form the desired article.

9. The method of forming a cigarette-holder, cigar-holder, pipe-stem, or the like, which comprises bonding together sections of infusible and substantially insoluble phenolic condensation products by introducing between said sections a fusible phenolic condensation product and converting the same to an infusible state, and then tooling the composite body to form the desired article.

10. The method of producing a cigarette-holder, a cigar-holder, or pipe-stem comprising sections of different colors, which comprises uniting sections of infusible and substantially insoluble phenolic condensation products possessing different colors by softening the surfaces to be united, introducing a fusible phenolic condensation product between said surfaces, subjecting the composite body to the action of heat for a prolonged period while the surfaces to be united are held in intimate contact, and tooling the composite body as an integral body to form the desired article.

11. A composite body comprising separately formed sections of infusible and substantially insoluble phenolic condensation products united by a bonding agent comprising a phenolic condensation product.

12. A composite body comprising sections of an infusible and substantially insoluble condensation products, said sections possessing different colors, united by a bonding agent comprising a phenolic condensation product.

13. A composite body comprising sections of an infusible and substantially insoluble condensation products, said sections possessing different colors, united by a bonding agent introduced between the sections as a fusible phenolic condensation product and converted by heat, while the sections are held in intimate contact, to an infusible condition.

14. An article, such as a cigarette-holder, cigar-holder or pipe-stem, comprising sections of infusible and substantially insoluble phenolic condensation products, said sections being of different colors, united together by a bonding agent comprising a phenolic condensation product, the composite body being suitably formed for the uniting of said sections.

15. The process of forming a composite body of the character set forth which comprises preparatorily manufacturing sections of infusible and substantially insoluble phenolic condensation products, possessing a slight excess of phenol, softening the surfaces of said sections by the application of a solvent and introducing a fusible phenolic condensation product between the surfaces to be united, and subjecting the sections to the action of heat while the surfaces to be united are held in intimate contact by suitable pressure.

16. The method of forming a composite body of the character set forth, which comprises preparatorily manufacturing sections of infusible and substantially insoluble phenolic condensation products, said sections being of different colors and having an excess of phenol therein, applying a solvent to the surfaces to be united and introducing a fusible phenolic condensation product, and subjecting the sections to heat treatment while the surfaces to be united are held in intimate contact under suitable pressure.

LAWRENCE V. REDMAN.
ARCHIE J. WEITH.
FRANK P. BROCK.